(12) United States Patent
Fathollahi et al.

(10) Patent No.: US 9,917,612 B2
(45) Date of Patent: *Mar. 13, 2018

(54) PROTECTIVE CASE HAVING MODULAR COMPONENTS

(71) Applicant: Incipio, LLC, Irvine, CA (US)

(72) Inventors: Andy Fathollahi, Corona Del Mar, CA (US); Tom Hee Kwon, Santa Ana, CA (US)

(73) Assignee: Incipio, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/243,865

(22) Filed: Aug. 22, 2016

(65) Prior Publication Data

US 2016/0359518 A1 Dec. 8, 2016

Related U.S. Application Data

(63) Continuation of application No. 14/590,945, filed on Jan. 6, 2015, now Pat. No. 9,425,848.

(60) Provisional application No. 61/924,703, filed on Jan. 7, 2014.

(51) Int. Cl.
*H04B 1/38* (2015.01)
*H04B 1/3888* (2015.01)
*A45C 11/00* (2006.01)

(52) U.S. Cl.
CPC ............ *H04B 1/3888* (2013.01); *A45C 11/00* (2013.01); *A45C 2011/003* (2013.01)

(58) Field of Classification Search
CPC .. H04B 1/3888; A45C 11/00; A45C 2011/003
USPC ....................................... 455/575.8
See application file for complete search history.

(56) References Cited

U.S. PATENT DOCUMENTS 9,425,848 B2 * 8/2016 Fathollahi

* cited by examiner

*Primary Examiner* — Michael Neff
(74) *Attorney, Agent, or Firm* — Manatt, Phelps & Phillips, LLP

(57) ABSTRACT

A protective case for a mobile device such as a tablet computer is disclosed that includes modular components that can be mixed and matched by the user at the point of purchase to facilitate creation of a user customizable look. The case includes a shell that is configured to retain the tablet device and a front cover that is configured to protect and conceal the screen of the tablet when the case is in the closed position. When the assembled case is in the open position and the tablet is retained within the shell, the cover is configured to stand the shell up on edge. The shell and front cover can be reversibly attached to one another by the user, so that the user can select a shell of one color, material, design, or style and a front cover of another color, material, design or style. Retention tab and slot are employed to reversibly lock the front cover to the shell to form a seamless integrated multi use mode case.

20 Claims, 10 Drawing Sheets

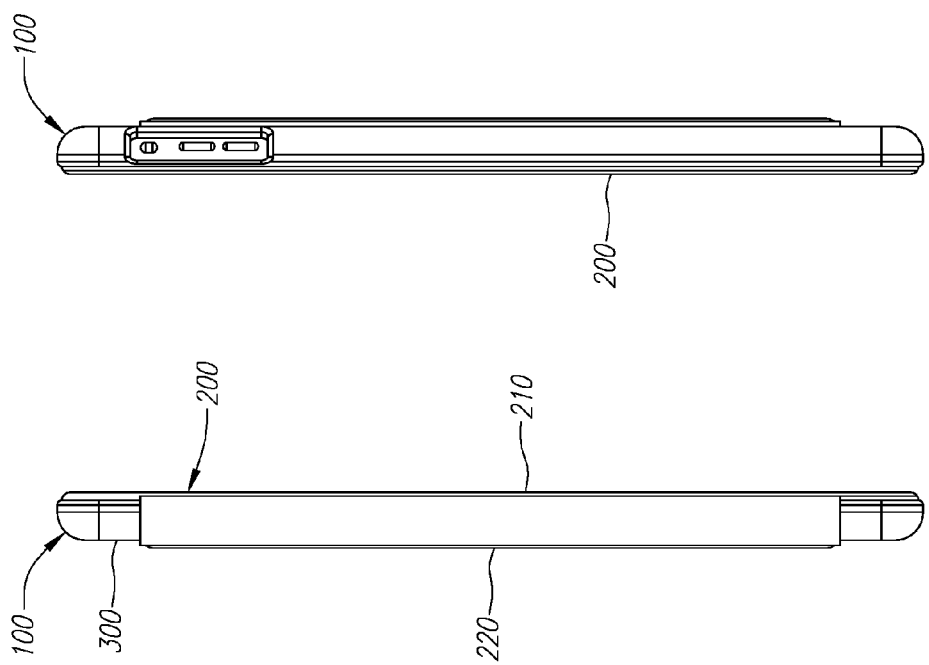

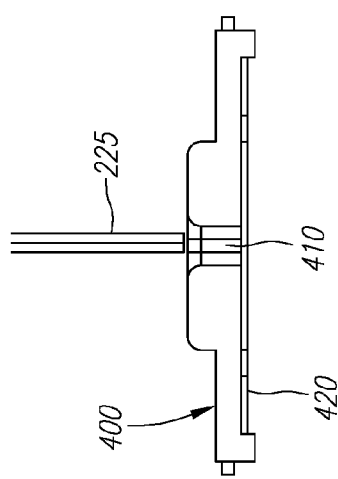
FIG. 4B
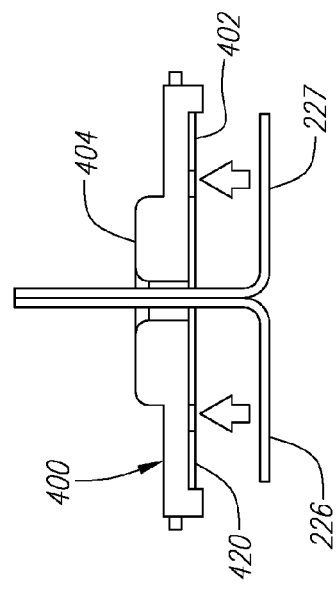
FIG. 4C
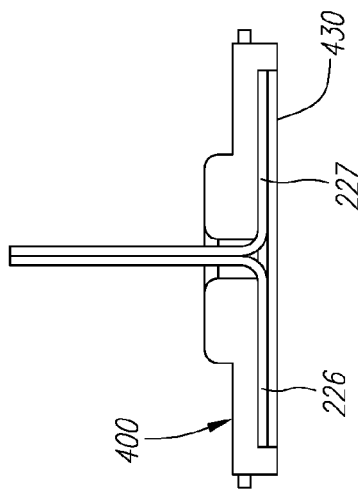
FIG. 4D
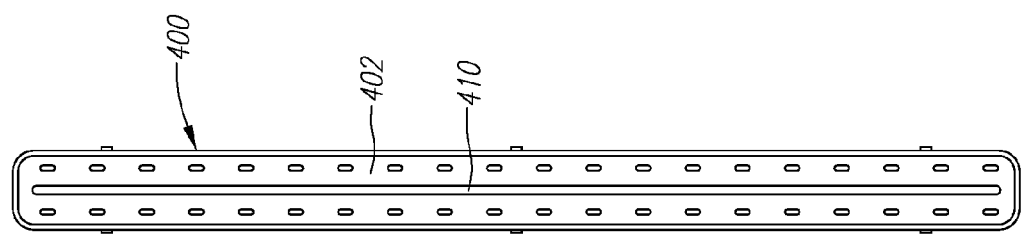
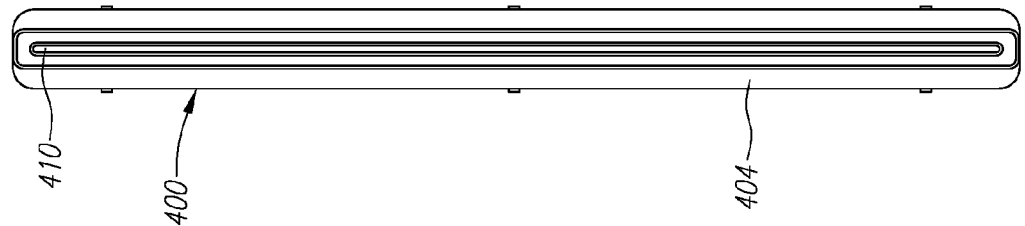
FIG. 4A

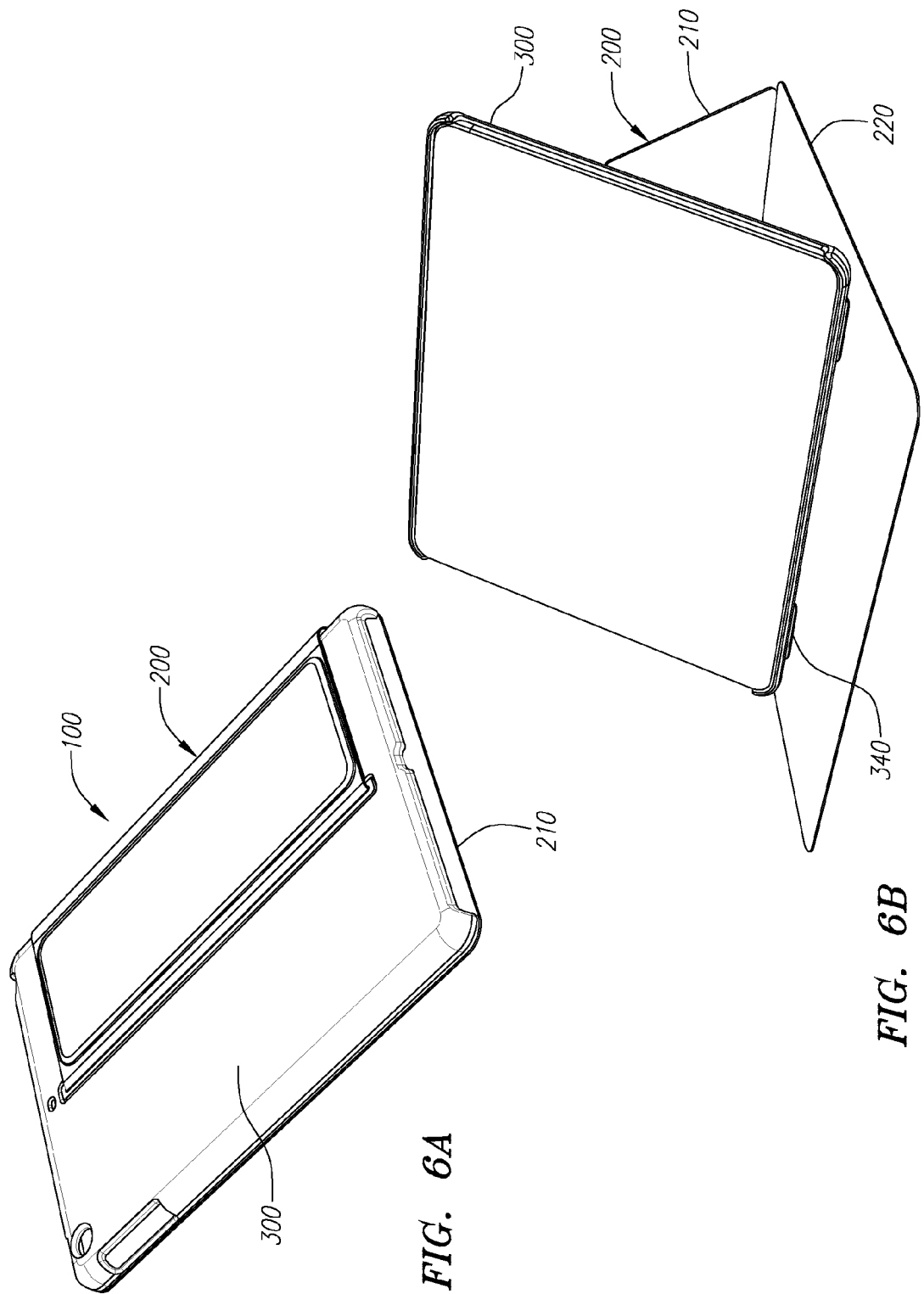

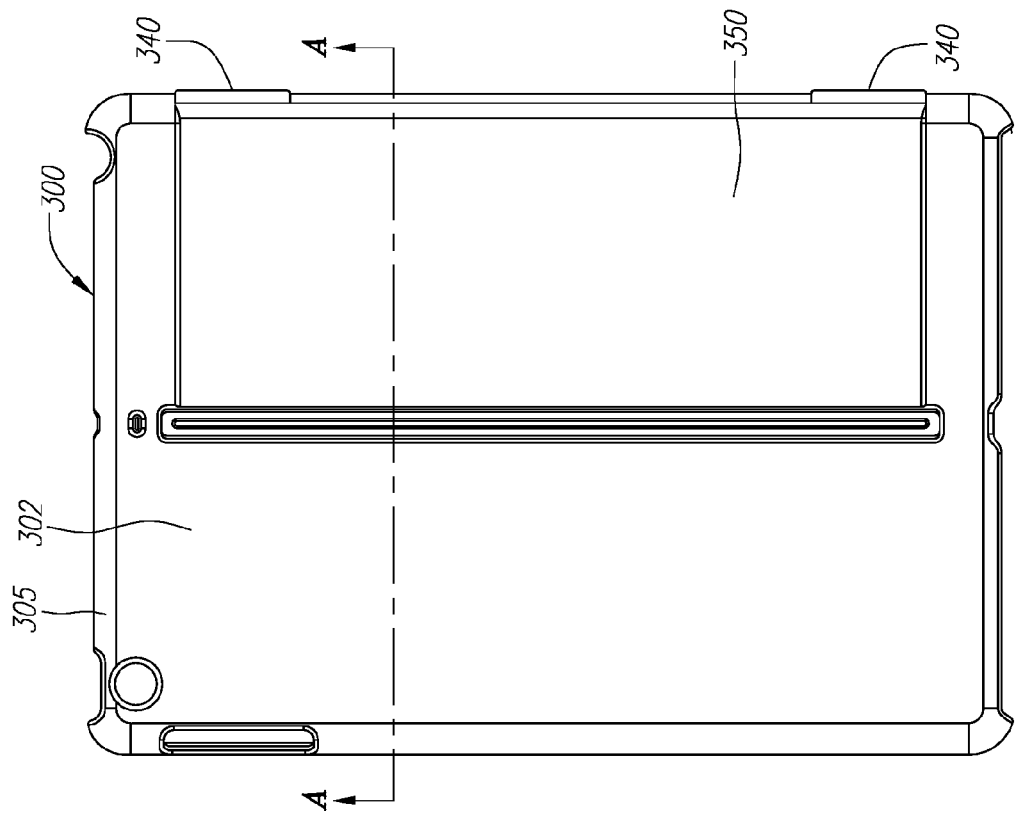
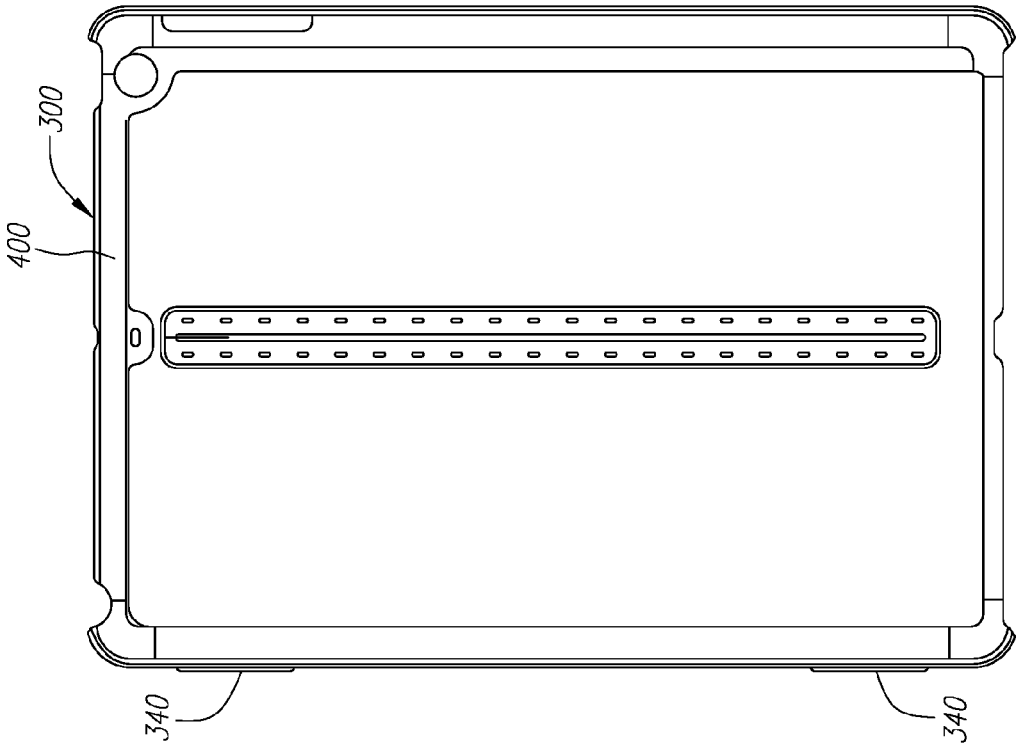
FIG. 7B
FIG. 7A

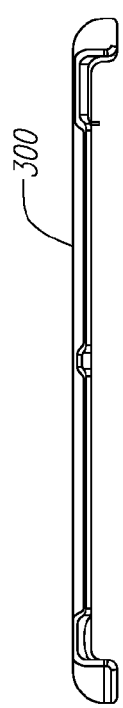
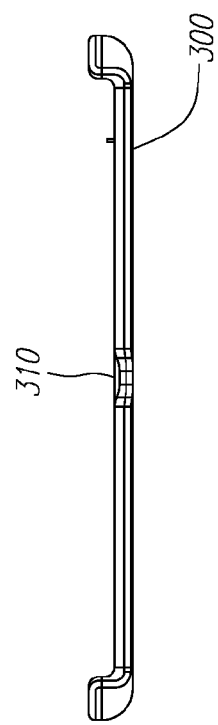
FIG. 7E
FIG. 7F
FIG. 7D
FIG. 7C

PROTECTIVE CASE HAVING MODULAR COMPONENTS

INCORPORATION BY REFERENCE TO RELATED APPLICATIONS

This application is a continuation of U.S. application Ser. No. 14/590,945, filed Jan. 6, 2015, which claims benefit under 35 U.S.C. § 119(e) from U.S. Provisional Application No. 61/924,703, filed on Jan. 7, 2014. The above applications are hereby incorporated herein by reference in their entirety and are to be considered as a part of this specification.

BACKGROUND OF THE INVENTION

Field of the Invention

This patent document relates to protective cases for mobile or handheld electronic devices such as tablet computers, smart phones, PDAs, MP3 players, and gaming devices.

Description of the Related Art

Protective cases for mobile devices are known in the art. Users of such protective cases, however, are becoming more and more conscientious of the aesthetics of such cases. It is not uncommon for users to have numerous protective cases of different colors or patterns for different occasions. It is also not uncommon for users to customize or personalize their protective cases with markings such as stickers, paint, ink and the like. From an inventory and manufacturing standpoint, it can be challenging to offer a suitable number of different aesthetics (styles, colors and textures) for even a single protective case model with sufficient diversity and availability to capture significant market share. As a result, manufacturers tend to make a limited number of colors or styles for their protective cases.

Accordingly, it is here recognized that there is a need for protective cases for mobile devices that have modular components that can be mixed and matched by the user, such that the user can select a first component having a first aesthetic look and a second component having a second aesthetic look and reversibly combine those two components into a functional protective case for a mobile device.

SUMMARY

There exists a continuing need for new and improved designs for cases for mobile devices that provide modular components that can be combined by the user to create a functional protective case with a user customized look.

The case includes a shell that is configured to retain the tablet device and a front cover that is configured to protect the screen of the tablet when the case is in the closed position. The shell and front cover can be reversibly attached to one another by the user, so that the user can select a shell of one color, material, design, or style and a front cover of another color, material, design or style.

Various aspects described in connection with the embodiments of the protective cases disclosed herein, including the drawings and claims, may be combined to form claims for a device, apparatus, system, methods of manufacture and/or use in any way disclosed herein without limitation.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments. FIGS. 1-8 illustrate various aspect of a single embodiment of the protective case for an Apple® iPad® tablet computer mobile device. (Apple and iPad are trademarks of Apple Inc.). It should be understood, however that the various aspects and teachings therein embodied are not limited to any particular mobile device but have wider applicability.

FIGS. 1A-1F are front face, back face, left side, right side, top side and bottom side views of a protective case configured to receive, retain, cover and protect a tablet computer. The protective case, which is shown in the fully closed position, includes a front cover and shell component that are reversibly interlocked to one another to provide user with modular design choices.

FIG. 2 is a back side view of the shell component illustrated in FIGS. 1A-1F, without the front cover portion attached thereto. The shell is depicted disassembled to show the configuration of the shell including the retention slot, recesses, and apertures, together with the rubber support feet. Also depicted is the retention tab in the form of a fabric lock that is dimensioned to fit through the retention slot when oriented on its edge and then be twisted to lock into position within a recessed wall region on the front side of the shell component. Additionally depicted is a shell slot insert (far left side), which may be inserted into the retention slot on the front side of the shell when the front cover is not connected to the shell to cover the slot and provide further protection to the tablet or mobile device when housed in the shell without the front cover being attached.

FIG. 3 is a front side view of the shell component illustrated in FIGS. 1A-1F further illustrating the configuration of the shell and the liner on the front side thereof with the slot insert position within the recess surface of the retention slot. The rubber feet illustrated are visible at their lower edge but reside on the back side of the shell as illustrated by the phantom lines.

FIG. 4A illustrates the front view (right) and back view (left) of the fabric lock retention tab. FIGS. 4B-4D illustrate the manner by which the retention tab may be connected to the end section of the front cover component. As illustrated in FIG. 4B outer and inner fabric layers of the cover component are fed through the slot on the retention tab through the back face. As illustrated in FIG. 4C, once the fabric layers are passed through the slot on the fabric lock retention tab, the inner and outer fabric layers are separated and glued into the recessed area on the front face of the fabric lock retention tab. As illustrated in FIG. 4D, after the fabric layers are glued, an embossed die cut liner may be glued over the fabric layers to cover the retention tab assembly.

FIGS. 6A-6B are perspective views of the assembled protective case when the protective case is in a completely closed position and when the protective case is opened for use, respectively. As illustrated in FIG. 6B the front cover serves to provide the tablet with an angled supported orientation or stand.

FIGS. 7A-7F are respective front face, back face, left side, right side, top side and bottom side views of the shell component of the protective case with the fabric lock retention tab positioned in the retention slot of the shell in the lock position and depicted without the front cover component attached thereto.

FIG. 8 is a cross-sectional view taken along line A-A of FIG. 7B further depicting the fabric lock retention tab in locked position with the retention slot of the shell.

DETAILED DESCRIPTION OF THE PREFERRED EMBODIMENT

Figure 1B:
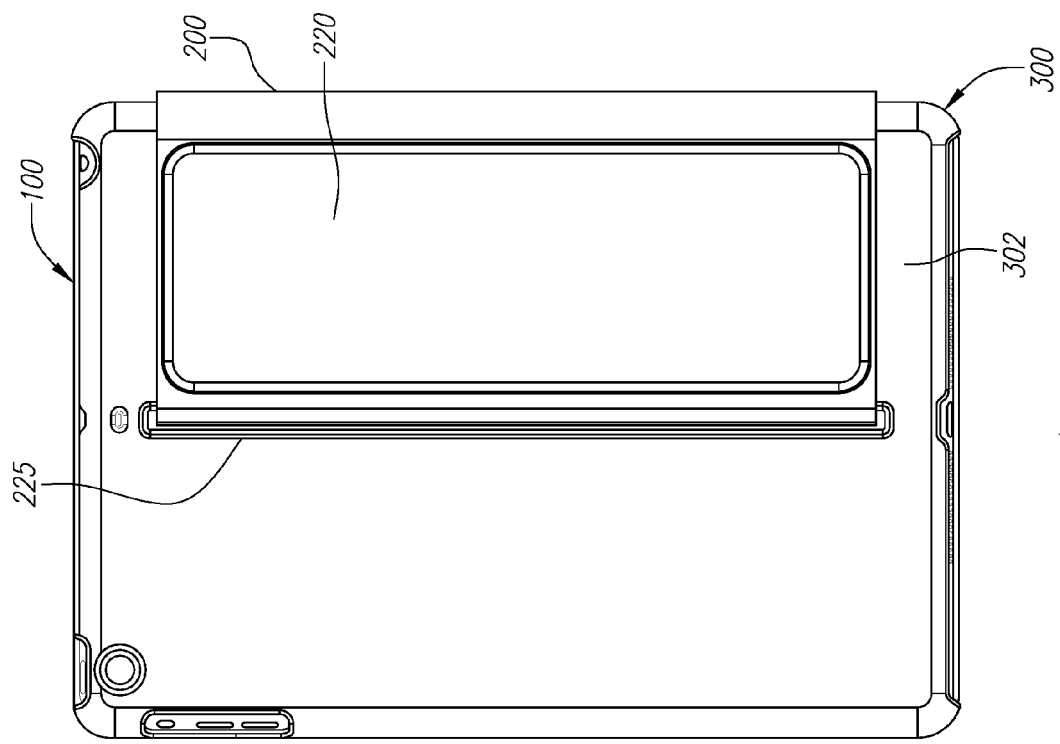
Figure 1A:
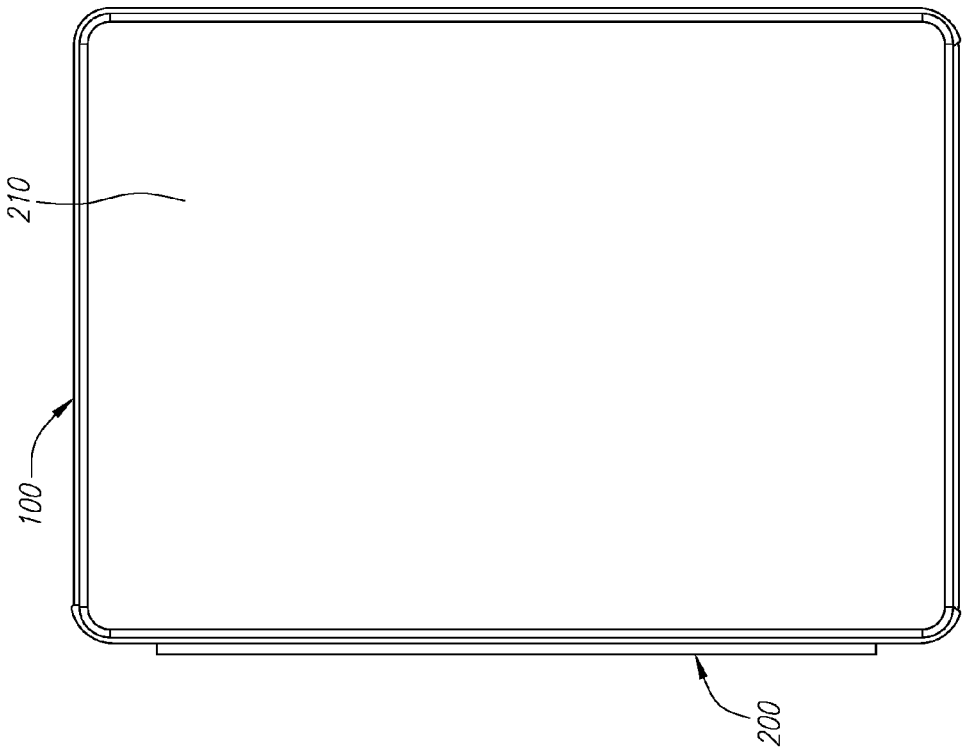

Disclosed herein is a protective case for a mobile device such as a tablet computing device having back face and a front face, a touchscreen on its front face, one or more control buttons, ports on its perimeter walls, and a camera window on its back face. References to "PC" means material comprised of polycarbonate, references to "TPR" means material comprised of thermoplastic resin, references to "EVA" means material comprised of ethylene-vinyl acetate, references to "Fabric" means synthetic and/or natural fabrics and leather materials.

FIGS. 1A-1F are front face, back face, left side, right side, top side and bottom side views of a protective case 100 configured to receive, retain, cover and protect a tablet computer, such as an Apple iPad. The protective case 100 includes a front cover 200 and a shell component 300 that are reversibly interlocked to one another to provide the user with modular design choices. The user can thereby personalize their protective cases by mixing and matching different front covers with different shell components.

Referring also to other drawings, the shell 300 has a front side 301 and an opposing back side 302 that is defined by back wall 305. The front cover 200 includes a first region 210 that is configured to cover the front face of the tablet device and a contiguously connected second region 220 that is configured to cover at least a portion of the back side 302 of the shell 300.

Figure 2:
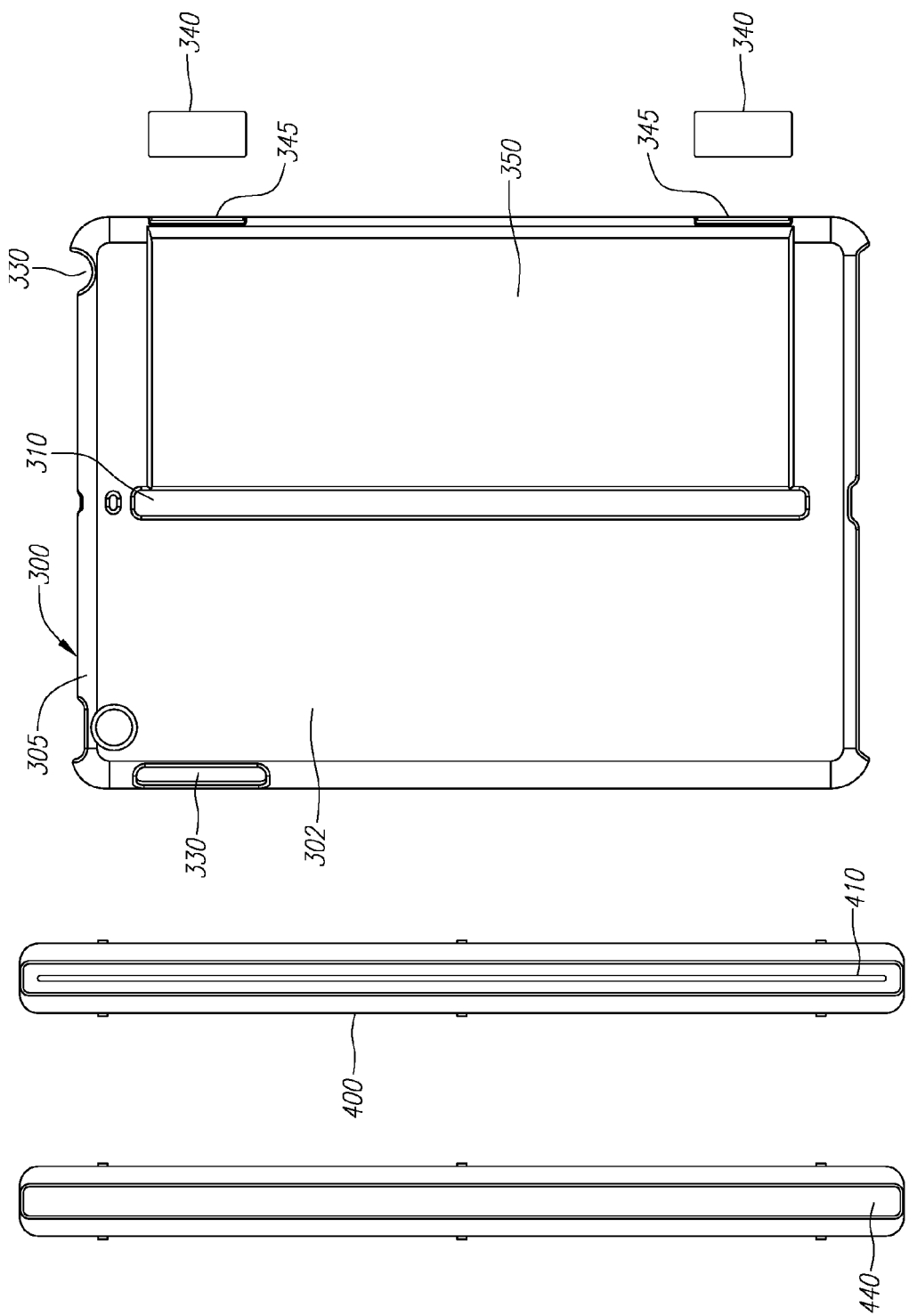

FIG. 2 is a back side view of the shell component 300 illustrated in FIGS. 1A-1F. The shell 300 is depicted disassembled to show the configuration of the shell 300 including the retention slot 310, recesses 345, and apertures 330, together with the rubber support feet 340 that fit within the recesses 345 when attached thereto. Also depicted is the retention tab 400 in the form of a fabric lock that is dimensioned to fit through the retention slot 310 when oriented on its edge and (once inserted through the retention slot 310) then be twisted back to lock into position within a recessed wall region 311 on the front side 301 of the shell component 300. Additionally depicted is a shell slot insert 440, which may be inserted into the retention slot 410 when the front cover 200 is not connected to the shell 300 to cover the slot 410 and provide further protection to a tablet housed within the shell.

Figure 3:
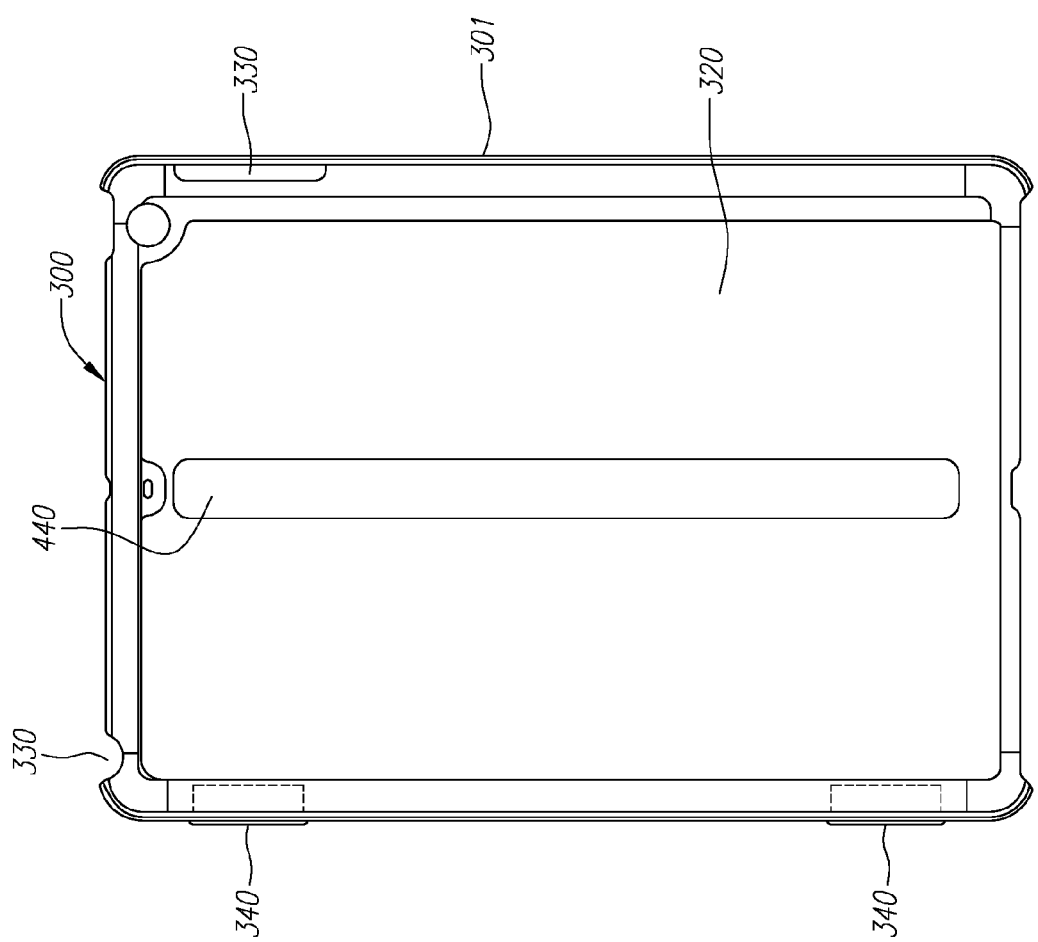
Figure 5A:
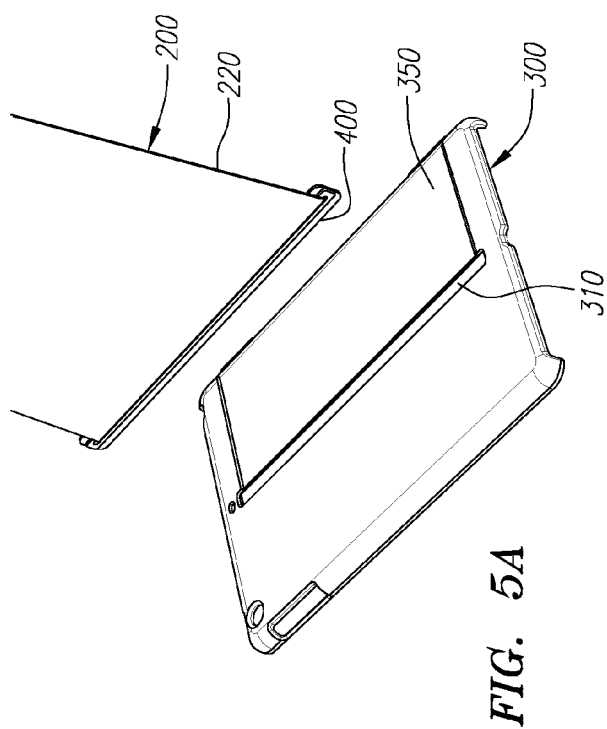
FIGS. 5A-5D illustrate four steps on how the user can reversibly attach the front cover component to the shell component via the retention tab and slot attachment connection. Namely the retention tab on the front cover is bent so that it is horizontal with the adjacent front cover, the tab and connected region of the front cover are fed through the retention slot on the shell, then the tab is rotated back and locked into position within the recessed surfaces adjacent the slot on the front side of the shell.
Figure 5B:
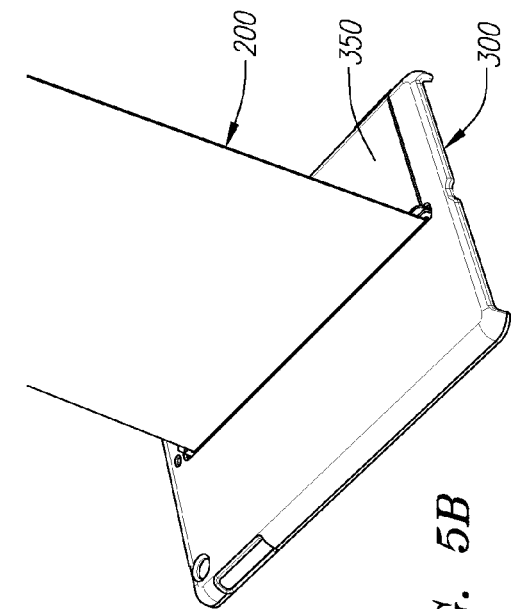
Figure 5C:
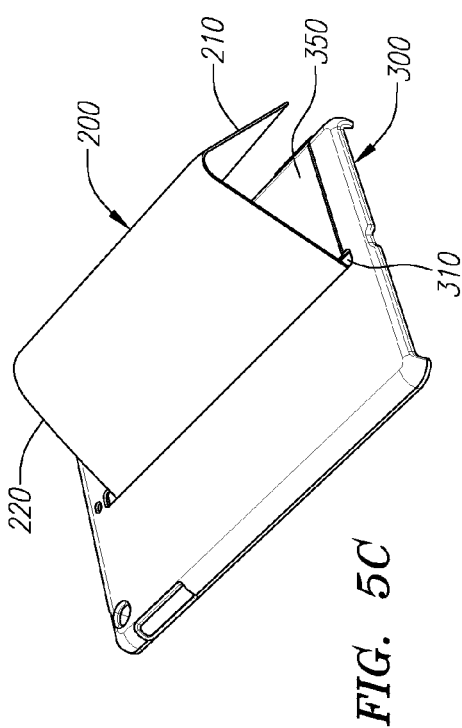
Figure 5D:
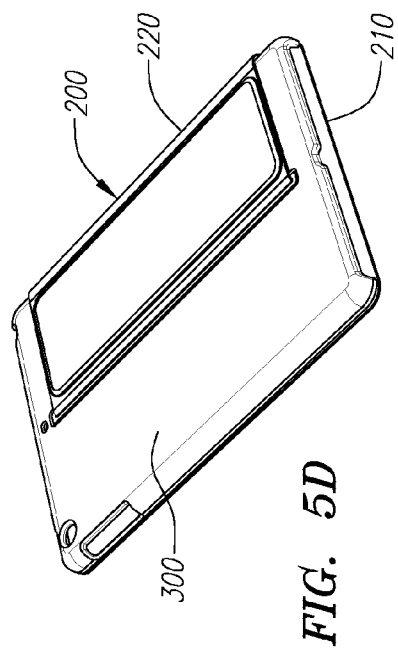

FIG. 3 is a front side view of the shell component 300 illustrated in FIGS. 1A-1F further illustrating the configuration of the shell and the liner 320 on the front side 301 thereof. The rubber feet 340 illustrated reside on the back side of the shell.

As best illustrated in FIG. 3, the front side 301 of the shell 300 is configured to receive and retain the tablet device while allowing user access to the touchscreen on the front face of the tablet. The shell 300 may be made of any suitable material such as polycarbonate or any other suitable polymer or plastic and may be formed via molding.

As best illustrated in FIG. 2, the shell 300 includes a front cover retention slot 310 within its borders that extends through the back wall 305 between the front and back sides 301 and 302 of the shell 300. The retention slot 310 may include a surrounding recessed region 311 imparted on the front side 301 of the shell 300.

As best illustrated in FIG. 3, the shell 300 may also include an internal liner 320 on the front side 301 and may include one or more apertures 330 to allow the user to access power buttons, headphone jacks, volume buttons, rotation screen buttons, etc., and allow for use of the tablet operability features such as camera windows and microphone or speaker ports.

As best illustrated in FIG. 2, the shell 300 may include rubber support feet 340 on the back side 302 at one or more discrete locations along the perimeter of the shell 300. The shell 300 may be configured to include recessed cavities 345 wherein those support feet 340 may be located or adhered so as to be more integrated. The shell 300 may also include another recessed region 350 that is adapted to receive a portion of the second region 220 of the front cover 200 when the case is in the closed position.

A retention tab 400 in the form of a fabric lock is connected to an end section 225 of the second region 220 as best illustrated in FIGS. 4A-4D. FIGS. 4A-4D illustrate the fabric lock retention tab 400 and the manner by which it may be connected to the end section 225 of the front cover component 200, which in the illustrated implementation is comprised of multiple fabric layers 226, 227 that can be inserted into a slot 410, through the back face 404, of the fabric lock retention tab 400 and glued to a recessed region 420 of the front face 402 thereof.

An EVA liner 430 is depicted as being glued on top of the glued fabric layers 226, 227 to finish the assembly.

The retention tab 400 is adapted to being reversibly inserted into said retention slot 310 and reversibly locked into position on the front side 301 of the shell 300 to create and assembled protective case 100 as best illustrated in FIGS. 5A-5D.

As best illustrated in FIG. 6A, the front cover 200 is configured to extend over and conceal the touchscreen when the case 100 is assembled and in the closed position. Whereas when the case 100 is in the open position, as shown in FIG. 6B, the front cover 200 serves as a support or stand. The bottom edge of the shell 300 (e.g., at the rubber feet 340) engaged to the inner surface of the cover to minimize slip while the second region 220 of the front cover 200 acts as a support stand that keeps or maintains the shell component 300 and tablet on edge like a kickstand on a bike.

FIGS. 7A-7F are front face, back face, left side, right side, top side and bottom side views of the shell component 300 of the protective case 100 that further depicts the fabric lock retention tab 400 locked into positioned within the recessed regions 311 adjacent the retention slot 310 of the shell 300. The retention tab 400 is depicted without the front cover component attached thereto.

Figure 8:
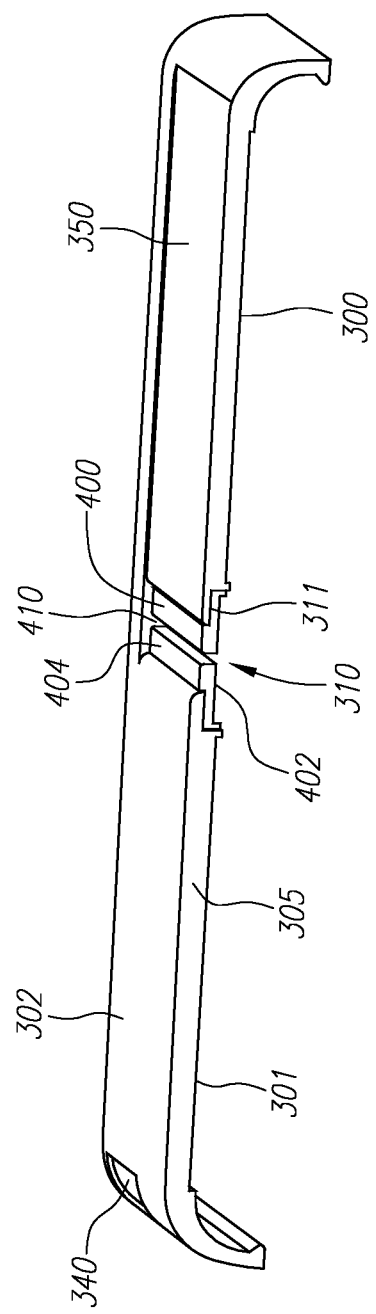

FIG. 8 is a cross-sectional view taken along line A-A of FIG. 7B further depicting the fabric lock retention tab 400 in locked position within the recessed region 311 adjacent the retention slot 310 of the shell 300.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the inventive aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A protective case configured to reversibly receive and retain an electronic device, said electronic device having a back face and a front face and a touchscreen on its front face, said case comprising:
   a shell defining a compartment configured to reversibly receive and retain the electronic device while providing user access to the touchscreen, said shell including a back wall that is dimensioned to cover at least a portion of the back face of the electronic device;
   a cover configured to be reversibly attached to the shell to form an assembled case, said cover including a first region that is configured to overlie the front face of the electronic device and a contiguously connected second region;
   a longitudinally extending opening extending through the back side of the shell to the front side of the shell, the opening being defined on a first side by a first portion of the back wall and on an opposing second side by a second portion of the back wall; and
   a retention tab comprising a first tab region and a second tab region, said retention tab residing at an end section of said second region, wherein said retention tab is adapted to being reversibly inserted into said opening and reversibly locked into position and supported on the front side of the shell at the first tab region by the first portion of the back wall and at the second tab region by the second portion of the back wall.

2. The protective case of claim 1, wherein when assembled, the cover and the shell are capable of pivoting relative to one another at the opening.

3. The protective case of claim 1, wherein said shell is generally in the form of a rectangle and wherein said slot is dimensioned to be defined completely internal to the perimeter of the shell.

4. The protective case of claim 1, wherein a recessed region imparted on the front side of the shell surrounds at least a portion of the opening.

5. The protective case of claim 1, wherein when the assembled case is in an open position and the electronic device is retained within the shell, the shell may be positioned to stand upright on edge at top of the cover.

6. The protective case of claim 1, wherein the retention tab is adhesively and mechanically attached to the end section of the second region.

7. The protective case of claim 1, wherein the retention tab extends beyond the dimensions of the end section of the second region to which it is attached.

8. The protective case of claim 1, wherein the first and second portions of the back wall include a recessed region on the front side of the back wall relative to adjacent regions thereto.

9. The protective case of claim 1, wherein the back side of the shell includes a recessed region that extends from the opening to a perimeter end region of one side of the shell.

10. The protective case of claim 1, wherein the shell and retention tab are relatively more rigid than the second region of the front cover.

11. The protective case of claim 1, wherein the retention tab is connected to the end section of said second region of the front cover via a second opening extending through the retention tab.

12. The protective case of claim 1 further comprising multiple front covers each having retention tabs that are configured to be reversibly attached to the shell via the opening.

13. The protective case of claim 1, wherein the retention tab is adapted to rotate along the connection with the end region of the second region of the front cover.

14. The protective case of claim 1, wherein the first and second regions of the front cover are comprised of a layered materials.

15. A protective case configured to reversibly receive and retain an electronic device, said electronic device having a back face and a front face and a touchscreen on its front face, said case comprising:
   a shell configured to receive and retain the electronic device, said shell including a back wall including a retention slot that extends through the back side of the shell to the front side of the shell and wherein the slot opening is defined on a first longitudinally extending side by a first portion of the back wall and on an opposing second longitudinally extending side by a second portion of the back wall;
   a front cover detachably connectable to the back wall of the shell and includes a first region that is configured to cover the front face of the electronic device and a contiguously connected second region that is configured to cover at least a portion of the back wall of the shell when the front cover is attached to the shell and the case is in a fully closed position; and
   a retention tab located at an end section of the second region, wherein said retention tab is adapted to being reversibly inserted into said retention slot and once inserted reversibly locked into position and supported on the front side of the shell thereby connecting the front cover to the shell to assemble the protective case.

16. The protective case of claim 15, wherein the shell includes a recessed region adjacent the retention slot and the tab is dimensioned to fit entirely within that recessed region.

17. The protective case of claim 15, wherein the shell and the front cover are hinged relative to one another at the connection between them.

18. A point of purchase presentation for a protective case system for reversibly receiving and retaining an electronic device, said electronic device having a back face and a front face and a touchscreen on its front face, said point of purchase presentation for a protective case system comprising:

multiple shell components, each configured to receive and retain the electronic device, each shell including a back wall having front and back sides and having a retention slot that extends through the back side of the shell to the front side of the shell and wherein the slot opening is defined on a first longitudinally extending side by a first portion of the back wall and on an opposing second longitudinally extending side by a second portion of the back wall;

multiple front covers, each front cover being configured to be detachably connectable to the back wall of each of the multiple shell components through the slot opening therein via a retention tab located at an end section of the front cover; and wherein the multiple shell components have different external appearances relative to one another and wherein the multiple front covers have different external appearances relative to one another.

19. The point of purchase presentation for a protective case system of claim 18, wherein each retention tab is adapted to being reversibly inserted into each retention slot and reversibly locked into position and supported on the front side of each shell and thereby assemble a protective case comprised of the connected components.

20. The point of purchase presentation for a protective case system of claim 19, wherein each retention tab comprises a first tab region and a second tab region, and wherein each retention tab is connected between the first and second tab regions, and wherein each retention tab is adapted to being reversibly inserted into each retention slot and reversibly locked into position and supported on the front side of each shell at the first tab region by the first portion of the back wall and at the second tab region by the second portion of the back wall.

* * * * *